Figure 1:
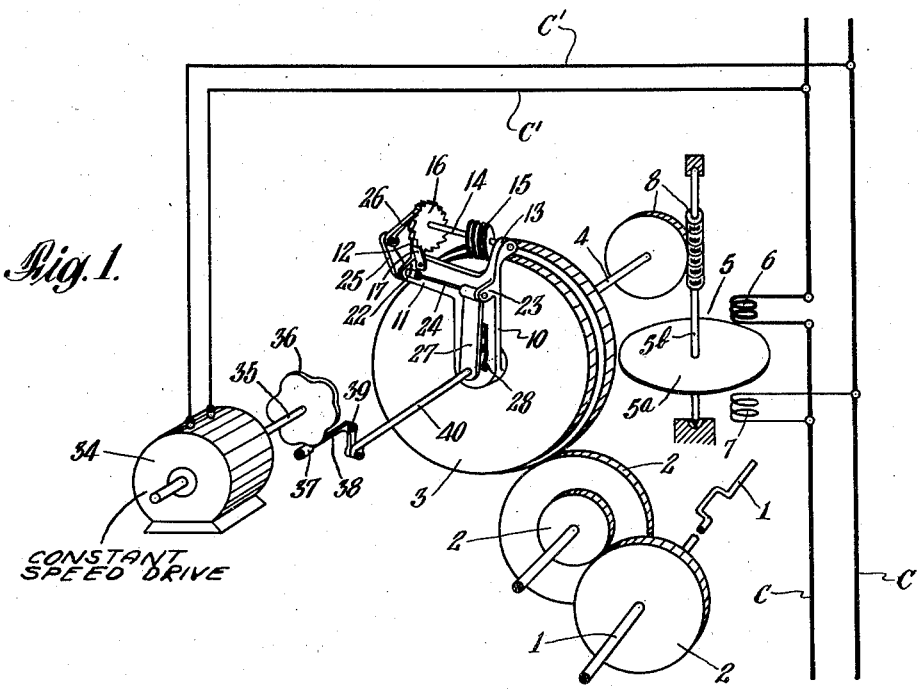

Nov. 22, 1938.  R. PUDELKO  2,137,807

ELECTRICITY METER

Filed Dec. 21, 1936

INVENTOR.

Richard Pudelko

BY Morgan, Finnegan & Durham

ATTORNEYS.

Patented Nov. 22, 1938

2,137,807

UNITED STATES PATENT OFFICE 2,137,807

ELECTRICITY METER

Richard Pudelko, Zug, Switzerland, assignor to Landis & Gyr, A.-G., a corporation of Switzerland Application December 21, 1936, Serial No. 116,914
In Switzerland December 31, 1935

5 Claims. (Cl. 171—34)

The invention relates to new and useful improvements in energy vending mechanisms and more particularly to such improvements in prepayment electricity meters adapted to impose a time charge and a current consumption charge.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Figure 2:
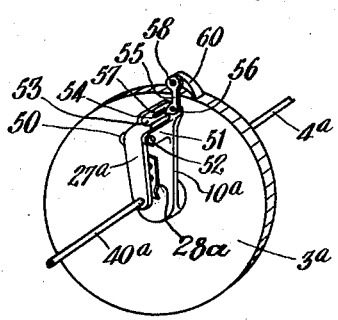

Of the drawing:

Fig. 1 is an isometric perspective, somewhat diagrammatic, in character, showing an embodiment of the invention; and Fig. 2 is an isometric perspective of a somewhat different embodiment of the invention.

The invention relates to automatic energy metering mechanisms, and in certain aspects more especially to prepayment electricity meters, and has for one of its main objects the provision of very simple, reliable and inexpensive mechanism concurrently imposing an energy consumption charge and a predetermined charge, such as a time charge, and if desired accumulating these charges against a predeterminedly set energy measure. The invention provides controlling mechanism wherein a member such as an arm rotates proportionately to the meter, the arm being connected to drive gearing which opens the power circuit switch when the set limit has been reached, and provides also a novel oscillating mechanism, driven by a time device such as a clock or a synchronous motor, which operates to additionally drive the gearing to advance the controlling switch proportionately to the time charge also.

Referring now in detail to the embodiment of the invention illustrated in Fig. 1 of the drawing, a driven shaft 1 is shown, which is connected to and advances the device or mechanism which opens the power line switch or otherwise controls the circuit. The shaft 1 is preferably driven by a gear train 2, meshing with a gear 3 which is loosely journaled on a shaft 4, which shaft is driven by the meter 5 which measures the energy consumed. The meter is shown with its disc 5ª driven by coils 6 and 7 connected with the circuit wires C, and a gearing 8 drives the shaft 4 from the meter spindle 5ᵇ. Fixed on the shaft 4 adjacent to the gear 3 is an arm 10, formed at its outer end into a laterally-extending member 11, and projecting upwardly from either end of the member 11, and extending over the periphery of gear 3 are two lugs 12 and 13, in which are journaled the ends of a shaft 14. Fixed on shaft 14 is a worm 15, which meshes with the gear 3. Fixed also on shaft 14 is a ratchet wheel 16. A spring detent 17 is mounted on the arm 11, and holds the ratchet wheel 16 against backward rotation.

Two brackets 22 and 23 are fixed to and extend from the arm 11, and a shaft 24 is journaled in these brackets. Fixed to the outer end of the shaft 24 is an arm 25, upon which is pivotally mounted a pawl 26 which engages the teeth of the ratchet wheel 16. Fixed also to the shaft 24 and extending downwardly therefrom to the center of the gear 3 is an arm 27, which arm is impelled outwardly from the arm 10 by a flat spring 28, fastened to the arm 10. A time-measuring mechanism, such as a clock or synchronous motor 34 is connected to drive a shaft 35 upon which is fixed a cam wheel 36. A synchronous motor 34 is shown having circuit wire connections C' with the circuit wires C. Cooperating with the cam wheel 36 is a cam roller 37, mounted on the end of a bent lever 38, which lever is pivotally mounted at 39 upon a suitable support. Pivotally connected to the other end of bent lever 38 is a reciprocable rod 40, concentric with shaft 4, and mounted in suitable bearings 41 and 42.

When power is being consumed, the meter 5 will rotate shaft 4 and arm 10, which arm through the worm 15 will carry the gear 3 angularly with it, and rotate the shaft 1 proportionately to the energy consumption. Independently of whether the arm 10 is advanced angularly by the meter, the time mechanism 34 will rotate the shaft 35, and thereby rock lever 38 and reciprocate the rod 40. The rod 40 in its forward reciprocatory movement will move the arm 27 against spring 28, and rock shaft 24 to retract pawl 26, and on backward reciprocatory movement of the rod 40 spring 28 will rock lever 27 in the opposite direction, and pawl 26 will rotate ratchet 16 and worm 15 will advance the gear 3 relatively to arm 10, thereby imposing the time charge and correspondingly rotating the shaft 1.

In Fig. 2 of the drawing is shown a modified form of the mechanism, wherein the gear wheel 3ᵃ is journaled loosely on the meter driven shaft 4ᵃ. Arm 10ᵃ is fixed on shaft 4ᵃ to rotate therewith. Lugs 50 and 51 project outwardly from the arm 10ᵃ, and the lever 27ᵃ is pivotally mounted at 52 in the lugs 50 and 51. The upper arm 53 of lever 27ᵃ extends inwardly from the pivot bearing 52 toward the outer end of the arm 10ᵃ, and has an elongated slot 54. A bent lever 55 is pivotally mounted at 56 upon the outer end of the arm 19ᵃ, one arm 57 of this lever projecting into the slot 54 in the arm 53 of the lever 27ᵃ. Pivotally mounted at 58 on the outer end of the bent lever is a pawl 60 which meshes with the ratchet teeth on the gear 3ᵃ. The shaft 4ᵃ is driven by the meter, and carries with it the arm 10ᵃ and rotates the gear 3ᵃ correspondingly to the current consumption. The rod 40ᵃ is reciprocated by the time mechanism, as already described, and actuates the lever 27ᵃ against the spring 28ᵃ. The actuation of the lever 27ᵃ rocks lever 55, and retracts and advances the pawl 60 and thereby imposes an additional forward drive on the gear 3ᵃ relatively to arm 10ᵃ, corresponding to the movement of the time mechanism 34, to impose the time charge.

The invention in its broader aspects is not limited to the specific mechanisms shown and described but departures may be made therefrom within the scope of the accompanying claims without departing from the principles of the invention and without sacrificing its chief advantages.

What I claim is:

1. In an electricity meter, in combination, a driven control means having a loosely mounted toothed wheel, a drive including a shaft rotated by a meter, an arm fixed on said shaft, a device mounted on said arm and normally engaging said toothed wheel to cause it to rotate with the arm, said device being movable to effect relative movement between said arm and wheel, means for imposing a base rate including a constantly driven shaft, a device reciprocated by said constantly driven shaft, and connections from said reciprocable device for moving said movable device on the arm to effect rotation of said toothed wheel relatively to said arm.

2. In an electricity meter, in combination, a driven control means having a loosely mounted toothed wheel, a drive including a shaft rotated by a meter, an arm fixed on said shaft, a device mounted on said arm and normally engaging said toothed wheel to cause it to rotate with the arm, said device including a pawl movable to effect relative movement between said arm and wheel, means for imposing a base rate including a constantly driven shaft, a device reciprocated by said constantly driven shaft, and connections from said reciprocable device for actuating the pawl to cause said movable device on the arm to effect rotation of said toothed wheel relatively to said arm.

3. In an electricity meter, in combination a driven control means having a loosely mounted driven toothed wheel, a drive including a shaft rotated by a meter, an arm fixed on said shaft, a driving wheel mounted on said arm and normally engaging said driven toothed wheel to cause it to rotate with said arm, means mounted on the arm for rotating said driving wheel including a pawl and ratchet, means for imposing a base rate including a constantly driven shaft, a device reciprocated by said constantly driven shaft, and connections from said reciprocable device to said pawl for actuating the pawl to rotate said driving wheel to effect relative movement between said arm and driven wheel.

4. In an electricity meter, in combination a driven control means having a loosely mounted driven toothed wheel, a drive including a shaft rotated by a meter, an arm fixed on said shaft, a driving wheel mounted on said arm and normally engaging said driven toothed wheel to cause it to rotate with said arm, means mounted on the arm for rotating said driving wheel including a pawl and ratchet, means for imposing a base rate including a constantly driven shaft, a cam on said shaft, a lever actuated by said cam, and connections from said lever to said pawl for actuating the pawl to rotate said driving wheel to effect relative movement between said arm and driven wheel.

5. In an electricity meter, in combination a driven control means having a loosely mounted driven toothed wheel, a drive including a shaft rotated by a meter, an arm fixed on said shaft, a driving wheel mounted on said arm and normally engaging said driven toothed wheel to cause it to rotate with said arm, means mounted on the arm for rotating said driving wheel, means for imposing a base rate including a constantly driven shaft, and connections from said constantly driven shaft to said driving wheel on the arm to effect relative movement between said arm and the driven wheel.

RICHARD PUDELKO.